US008145833B1

United States Patent
Duan

(10) Patent No.: US 8,145,833 B1
(45) Date of Patent: Mar. 27, 2012

(54) COMPRESSION SOLUTION FOR EMBEDDED DEVICES AND SYSTEMS

(75) Inventor: Binghua Duan, Shanghai (CN)

(73) Assignee: CSR Technology Holdings Inc., San Jose, CA (US)

( * ) Notice: Subject to any disclaimer, the term of this patent is extended or adjusted under 35 U.S.C. 154(b) by 268 days.

(21) Appl. No.: 12/609,560

(22) Filed: Oct. 30, 2009

(51) Int. Cl.
*G06F 12/00* (2006.01)
(52) U.S. Cl. ....................................... 711/104
(58) Field of Classification Search ................ None
See application file for complete search history.

(56) References Cited

U.S. PATENT DOCUMENTS

| | | | | |
|---|---|---|---|---|
| 5,347,600 | A * | 9/1994 | Barnsley et al. | 382/249 |
| 6,126,605 | A * | 10/2000 | Washburn et al. | 600/454 |
| 7,702,171 | B2 * | 4/2010 | Murai et al. | 382/243 |

* cited by examiner

*Primary Examiner* — Hiep Nguyen
(74) *Attorney, Agent, or Firm* — Pillsbury Winthrop Shaw Pittman LLP

(57) ABSTRACT

An embedded device is hibernated by storing state data of the embedded device to a non-volatile data storage medium, and powering off the embedded device. The embedded device is later woken up in response to the detection of a wakeup event from a wakeup source. The state data stored in the RAM of the embedded device comprises one or more registers of a Central Processing Unit (CPU) of the embedded device, one or more registers of a system-on-chip (SOC) of the embedded device, and the system and applications code and data. Waking the embedded device comprises loading, from the non-volatile data storage medium, initial memory sections that are used to run a kernel of the embedded device. State data that is stored in the RAM of a system is compressed by dividing the RAM into a plurality of sections and independently choosing, for each section in the plurality of sections, a compression arithmetic. For each section, a compression arithmetic that has a high decompression speed is selected. The selected compression arithmetic is used to compress data in the section.

15 Claims, 6 Drawing Sheets

COMPRESSION SOLUTION FOR EMBEDDED DEVICES AND SYSTEMS

FIELD OF THE INVENTION

The present invention is related to embedded systems, and more particularly, to a method and apparatus for compressing data for hibernation of an embedded system.

BACKGROUND OF THE INVENTION

Performance and power consumption are key elements for embedded devices, or embedded systems. Currently, embedded devices enter a sleep or deep sleep state in response to users' pressing of power buttons to switch off the embedded devices. In sleep or sleep state, however, data is stored on the SDRAM of the embedded device, and power is consumed in order to maintain the data stored on the SDRAM. Although this power consumption is low, it is nevertheless non-zero, and power consumption is especially evident if the SDRAM is a DDR2 SDRAM.

In addition, because of the non-zero power consumption by the SDRAM, eventually battery may run out of power. When the battery runs out of power, the content of the SDRAM will no longer be maintained, and user data may be lost.

Hibernation mode is a feature that is widely used in personal computer systems, and is supported by operating systems such as Microsoft Windows XP, Microsoft Windows Vista, and Linux. In hibernation mode, content from the RAM is saved to non-volatile storage (e.g., hard disk) before the system is powered off. Upon power on or waking from hibernation mode, content is copied back to the RAM from the non-volatile storage and the system is restored to the state it was in before hibernation was invoked, allowing programs to continue executing from the pre-hibernation state. However, there is no good support for hibernation in current embedded systems.

Current embedded systems include, but are not limited to, GPS receivers, which are frequently embedded within personal navigational systems (PNDs). With the development of radio and space technologies, several satellites based navigation systems (i.e. satellite positioning system or "SPS") have already been built and more will be in use in the near future. SPS receivers, such as, for example, receivers using the Global Positioning System ("GPS"), also known as NAVSTAR, have become commonplace. Other examples of SPS systems include, but are not limited to, the United State ("U.S.") Navy Navigation Satellite System ("NNSS", also known as TRANSIT), the Russian counterpart to NAVSTAR known as the Global Navigation Satellite System ("GLONASS"), and any future Western European SPS such as the proposed "Galileo" program. As an example, the U.S. NAVSTAR GPS system is described in GPS Theory and Practice, Fifth ed., revised edition by Hofmann-Wellenhof, Lichtenegger and Collins, Springer-Verlag Wien N.Y., 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time (i.e. navigation solution).

As should be apparent, there is an important amount of GPS information that is accumulated by the receiver and that is needed to perform navigation. This information is typically lost when the internal memory of a GPS system loses power and cannot be refreshed. So when the system power is restored, this information needs to be accumulated all over again, which takes substantial time. Therefore, it would be advantageous to provide a hibernation mode to embedded systems and devices, such as GPS receivers, and further to provide a means of storing useful information such as GPS information in more permanent storage during hibernation.

Relatedly, to conserve memory during hibernation, compression is sometimes needed. There are three main aspects to evaluating data compression: compression ratio, compression/decompression throughput, and amount of memory used to perform compression/decompression. For data compression in a hibernation process, compression ratio and compression/decompression throughput are the important aspects. In a hibernation process, compressed data that is stored to non-volatile storage must be read and decompressed upon waking. The time it takes to read and decompress data depends on the amount of data that needs to be read and the decompression throughput. A higher compression ratio results in less data stored on the non-volatile storage and less time in reading. A higher decompression throughput results in less time in decompression.

Various compression techniques may be applied to compress data. The different compression techniques, however, have different compression ratios and compression/decompression throughput. Typically, there is a tradeoff between a compression technique's compression ratio and compression throughput. The higher the compression ration, the longer the amount of time to compress/decompress the data and hence the lower the throughput.

Therefore, there is a need to provide solutions for a fast wake-up time from hibernation, as well as provide a compression technique that balances the needs for both a high compression ratio and a high compression/decompression throughput to achieve fast wake-up time from hibernation.

SUMMARY OF THE INVENTION

According to an aspect of the present invention, an embedded device is hibernated by storing CPU and SOC data in the RAM of the embedded device, storing the RAM data to a non-volatile data storage medium, and powering off the embedded device. In furtherance of this aspect, the embedded device is later woken up in response to the detection of a wakeup event from a wakeup source. According to further aspects of the present invention, some or all of the data in the RAM of a system is compressed by dividing the RAM into a plurality of sections and independently choosing, for each section in the plurality of sections, a compression arithmetic. For each section, a compression arithmetic that has a high decompression speed is selected. The selected compression arithmetic is used to compress data in the section. The compressed data is then compared to a threshold to determine whether the compression ratio is acceptable. The threshold may be set by a user. If the compression ratio is acceptable, the compressed data is stored to non-volatile storage. If the compression ratio is not acceptable, another compression arithmetic is used to compress the data, and the newly resulting compression ratio is reexamined for acceptability. This may be performed as long as there are untested compression arithmetic. The process may be set up to use at least two different compression arithmetic, but is not limited by any upper limit on the number of compression arithmetic that may be tried.

In furtherance of these and other aspects, the data stored in the RAM of the embedded device comprises one or more registers of a Central Processing Unit (CPU) of the embedded device, and one or more registers or of a system-on-chip (SOC) of the embedded device. According to further aspects of the invention, the CPU and SOC data includes information that is useful for performing a GPS navigation solution.

In additional furtherance of these and other aspects, waking the embedded device comprises loading, from the non-volatile data storage medium, initial memory sections that are used to run a kernel of the embedded device.

In yet additional furtherance of these and other aspects of the invention, information that indicates which compression arithmetic is used for which section of RAM data is stored. Based on this information, when the compressed sections are decompressed, the appropriate decompression arithmetic is selected for each compression section.

DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
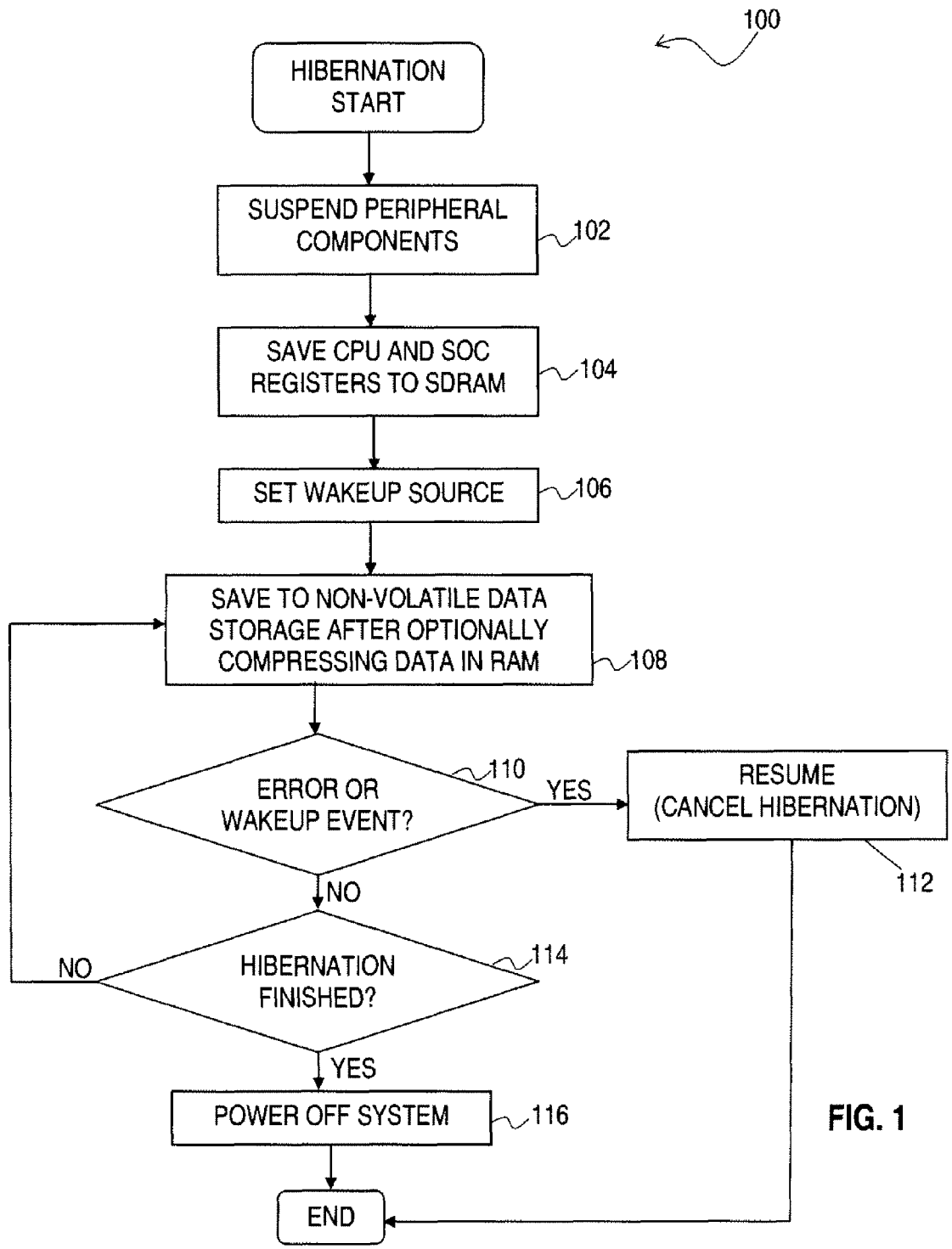
FIG. 1 depicts a flow diagram 100 that illustrates exemplary steps for hibernating an embedded device.

FIG. 1 depicts a flow diagram 100 that illustrates exemplary steps that implement the present invention. When hibernation of an embedded device starts, the operations of peripheral components such as LCD displays, touch panel, and audio players are suspended (step 102). Next, data containing information about the state of the embedded device (e.g., data in CPU and SoC registers and other types of on-chip memory) is stored to RAM storage (step 104). RAM storage may be SDRAM, DDR SDRAM, or any other type of RAM storage. A wakeup source is set in step 106. The wakeup source may be, for example, a power button such that when a user presses the power button, an embedded device in hibernation will wake up from hibernation and resume operation.

Next, in step 108, the data containing information about the state of the embedded device that is stored in RAM memory is stored to non-volatile data storage together with a tiny kernel and initial sections of RAM needed to run the tiny kernel. The remaining sections of RAM memory are then stored to non-volatile data storage. The remaining sections of RAM can include, for example, operating system code and data, application code and data, DMA buffers, etc., and can comprise up to 60 MB of data or more. In some embodiments, the remaining data is optionally compressed before storage, in other embodiments it is not. Non-volatile data storage may be a hard disk, an SD card, MMC memory, NAND flash, etc.

If no error or wakeup event is received during optional data compression and/or storage to non-volatile memory (step 110), then optional data compression and/or storage (step 108) continues as long as hibernation is not finished ("NO" in step 114). Once hibernation is finished ("YES" in step 114), the embedded device is powered off (step 116). If an error or wakeup event occurs during optional data compression and storage to non-volatile memory, then the embedded device resumes operation (i.e., hibernation is cancelled) in step 112.

Figure 2A:
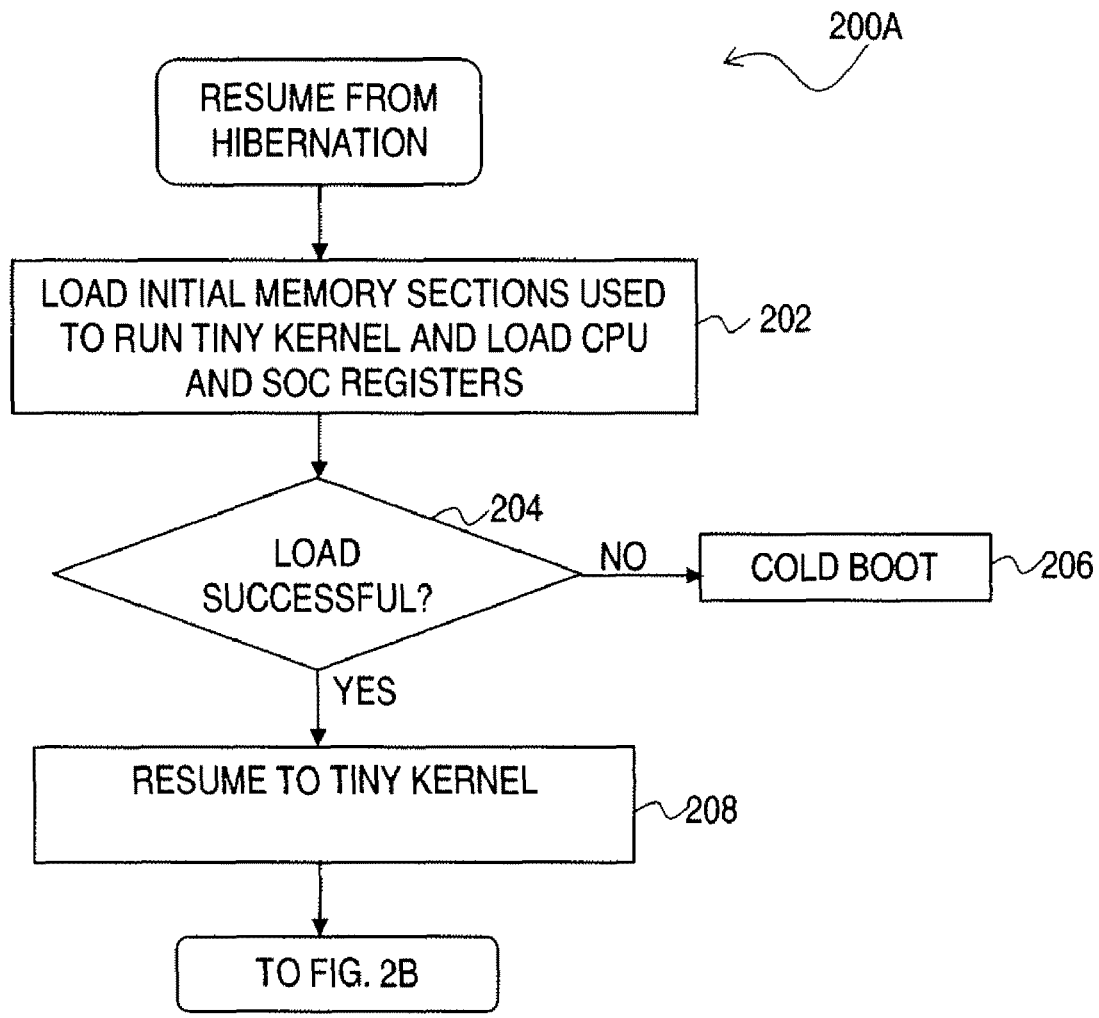
FIGS. 2A and 2B depict flow diagrams 200A and 200B, respectively, that illustrate exemplary steps for waking an embedded device from hibernation.
Figure 2B:
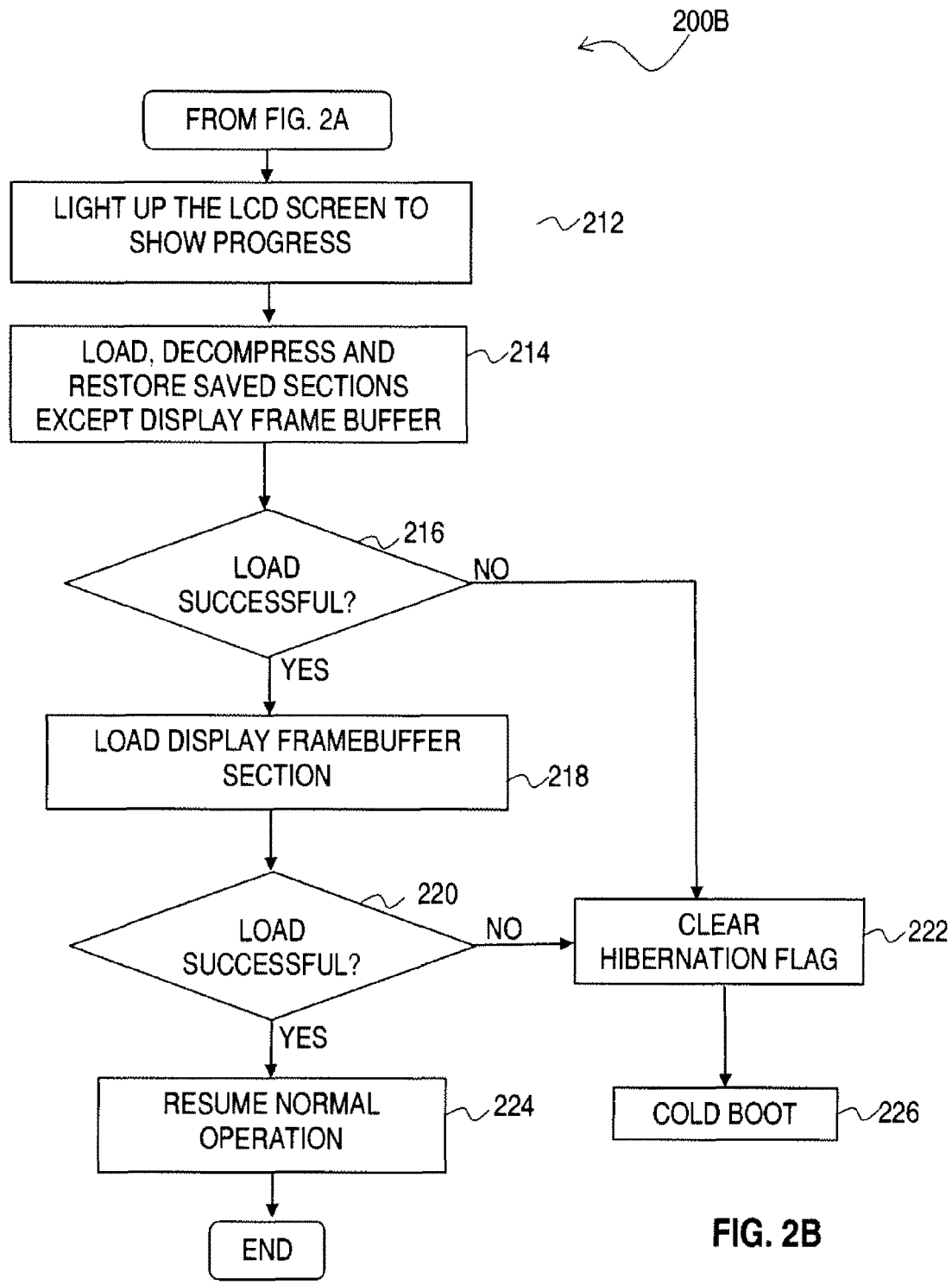

FIGS. 2A and 2B depict flow diagrams 200A and 200B, respectively, that illustrate exemplary steps for waking an embedded device from hibernation. An embedded device wakes from hibernation in response to detection of a wakeup event from a wakeup source, such as the pressing of the power button. When an embedded device is to resume from hibernation, initial memory sections used to run the embedded system tiny kernel are loaded to RAM and the saved CPU and SoC registers (e.g. data saved in step 104 described above) are restored by a boot-loader process (step 202), which is a process well known to those skilled in the art. The tiny kernel contains the operating system kernel for the embedded device, and must be loaded before further loading can be performed. If the load is successful (step 204), then the tiny kernel is resumed (step 208), and the process proceeds to flow diagram 200A of FIG. 2A. If the load of the tiny kernel is not successful, the embedded device is cold booted (step 206). In cold boot, the embedded device is booted without data indicating what state the embedded device was in before the hibernation (e.g. without the data saved in step 104).

Referring now to flow diagram 200B in FIG. 2B, after the tiny kernel has been successfully loaded, a splash screen is drawn (step 212). A splash screen may indicate to the user that the embedded device is in the midst of resuming operation from a hibernation state. Next, in step 214, all remaining sections except the display frame buffer section are decompressed (if data is compressed in the first place) and loaded. As set forth above, these sections can include operating system code and data, application code and data, DMA buffer data, etc.

If the loading of the sections besides the display frame buffer section is successful (step 216), the display frame buffer section is loaded (step 218). Once the display frame buffer section is loaded, the display screen on the embedded device will display information that was on the display before the embedded device went into hibernation. Upon viewing this, the user may proceed to operate with the embedded device. Therefore, the display frame buffer section will not be loaded until all other sections are loaded and the embedded device is ready for normal operation. If the display frame buffer section is also successfully loaded (step 220), then normal operation resumes (step 224). If either of the loading steps (steps 214 and 220) fails, the hibernation flag is cleared (step 222), and the step is cold booted (step 226). The cold boot performed in step 226 may be the same as the cold boot performed in step 206.

According to another aspect of the present invention, data in the RAM of a system is compressed during hibernation using new techniques that improve hibernation performance.

In an embodiment, compression is achieved by dividing the RAM into a plurality of sections and independently choosing, for each section in the plurality of sections, a compression arithmetic. In one embodiment, for each section, a compression arithmetic that has a high decompression speed is selected. However, other metrics are possible, as will be appreciated by those skilled in the art. The selected compression arithmetic is used to compress data in the section. The compressed data is then compared to a threshold to determine whether the compression ratio is acceptable. The threshold may be set by a user, or may be hard-coded or determined dynamically. If the compression ratio is acceptable, the compressed data is stored to non-volatile storage. If the compression ratio is not acceptable, another compression arithmetic is used to compress the data, and the newly resulting compression ratio is reexamined for acceptability. This may be performed as long as there are untested compression arithmetic. The process may be set up to use at least two different compression arithmetic, but is not limited by any upper limit on the number of compression arithmetic that may be tried.

In furtherance of this aspect of the invention, information that indicates which compression arithmetic is used for which section of RAM data is stored. Based on this information, when the compressed sections are decompressed, the appropriate decompression arithmetic is selected for each compression section. It should be noted that although the present invention is well suited and particularly described herein with respect to hibernation of an embedded device such as a PND, the compression techniques of the invention can be extended to other types of devices such as computers, etc.

Figure 3:
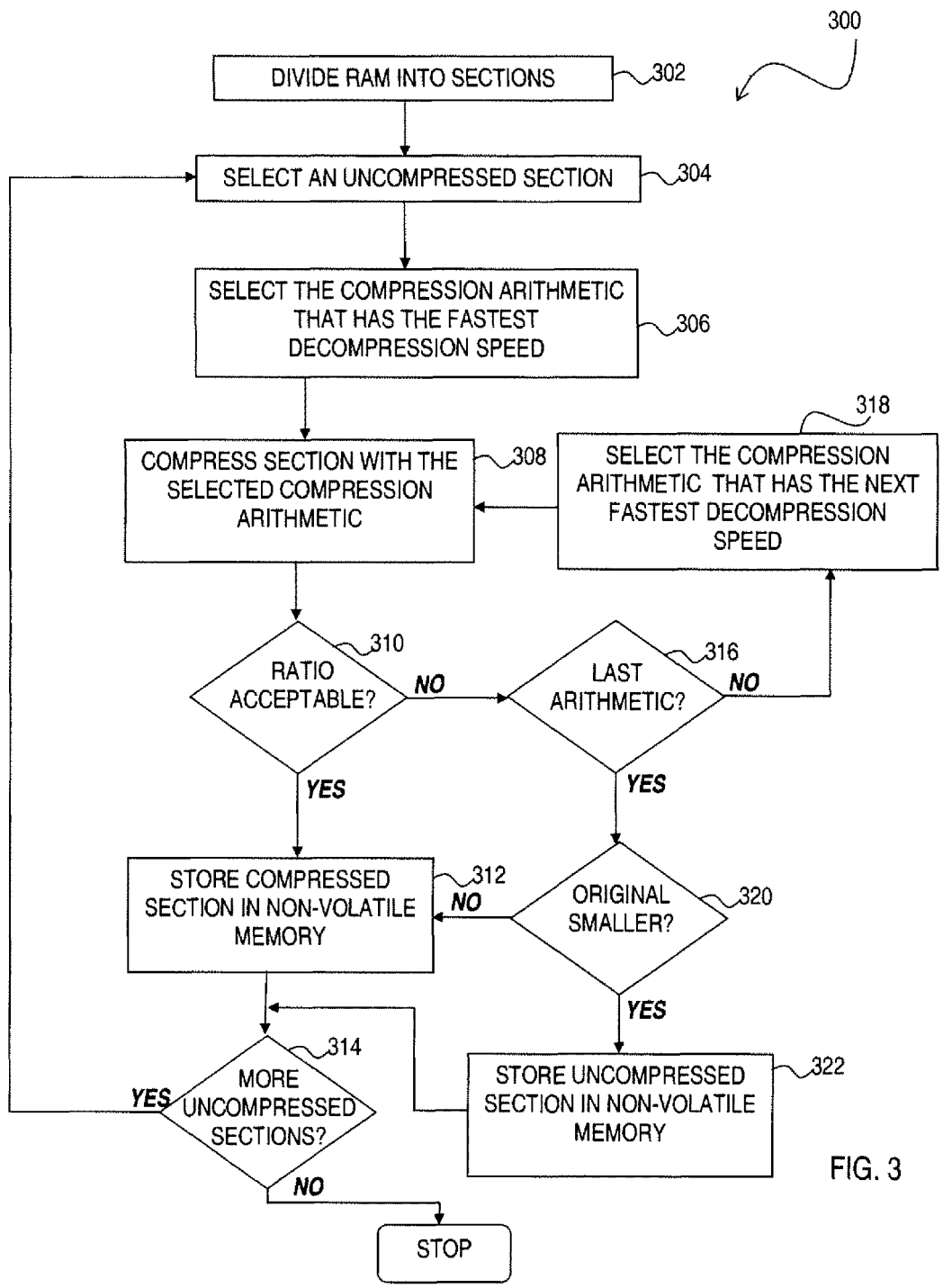
FIG. 3 depicts a flow diagram 300 that illustrates exemplary steps for compressing data in the RAM of a system.

FIG. 3 depicts a flow diagram 300 that illustrates exemplary steps that perform steps for compressing RAM data and storing the compressed data to non-volatile storage. This process can be included, for example, in step 108 described above. However, the invention is not limited to this example.

Figure 4:
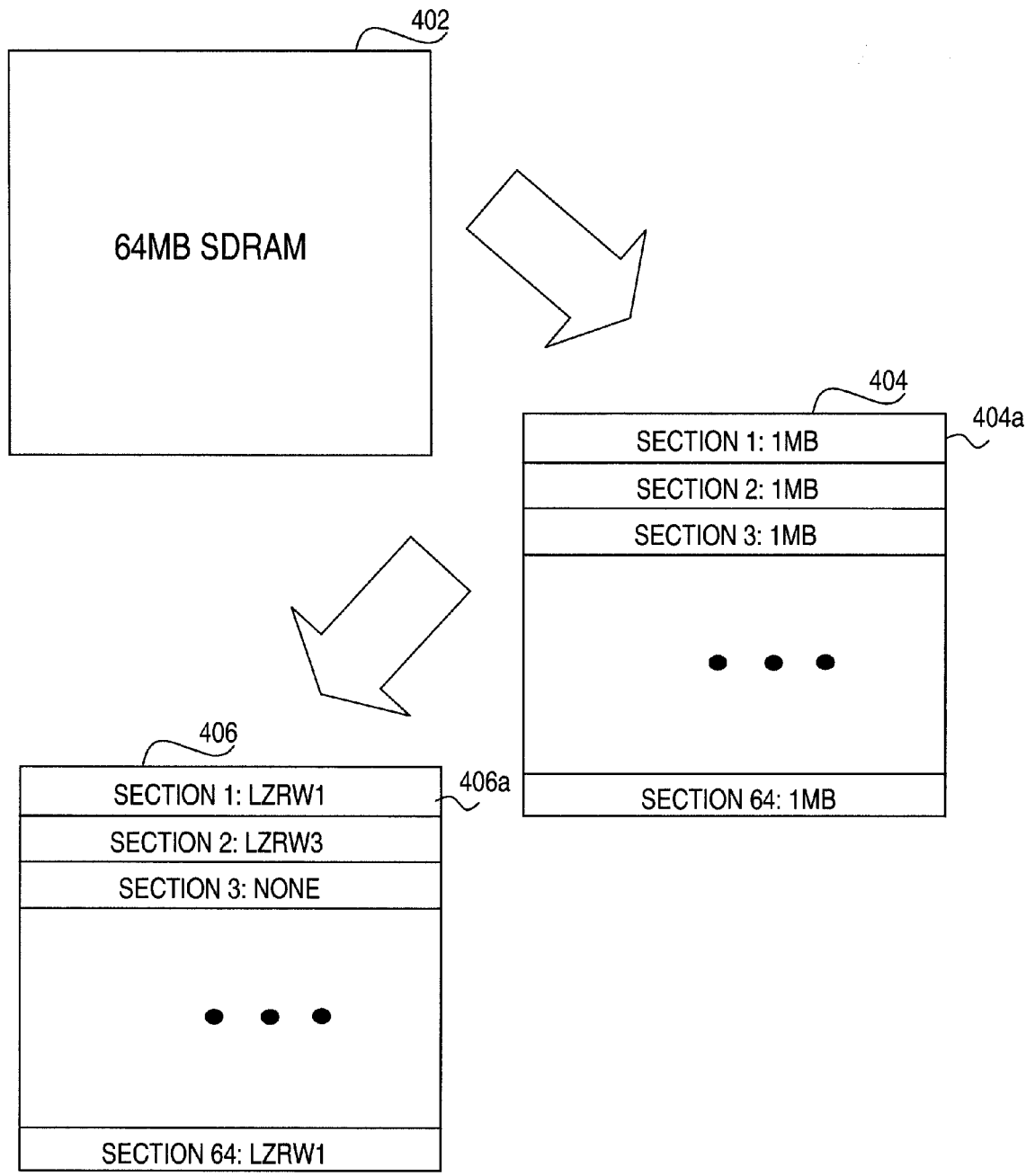
FIG. 4 depict exemplary RAMs in various stages of an exemplary process.

In step 302, the RAM storage is divided up into sections. An exemplary RAM storage is SDRAM, such as SDRAM 402 depicted in FIG. 4. In one example, SDRAM 402 is 64 MB, and may be divided up into 64 sections of 1 MB each. A divided SDRAM 404 is also depicted in FIG. 4. Although this example depicts dividing a 64 MB-SDRAM into 1 MB-sections, it should be apparent to persons skilled in the art that the present invention is not limited to any particular size or type of RAM storage or any particular size of sections. According to one embodiment, the RAM storage may be divided into different sections according to what purpose the RAM storage was used for in the system to be hibernated.

Next, in step 304, a uncompressed section of the divided RAM storage is selected for processing. Initially, before any processing or compression is performed, all sections of the divided RAM storage is considered to be uncompressed. In an example, section 404*a* of SDRAM 404 may be selected as the uncompress section for processing. In step 306, a compression arithmetic is selected for processing the selected uncompress section (e.g., section 404*a*). Several compression algorithms, with varying compression ratios and compression/decompression throughput, are considered in the process. Examples of compression algorithms that can be used in accordance with the invention, include, but are not limited to, LZRW1, LZRW2, LZRW3, GZIP, and BZERO. In step 306, the compression arithmetic with the fastest decompression speed (i.e., highest compression/decompression throughput) is selected.

Using the selected compression arithmetic, the selected section is compressed (step 308). The resulting compression ratio is examined and a determination is made as to whether the compression ratio is acceptable (step 310). A threshold for an acceptable compression ratio may be preset by a user. For example, the compression ratio threshold may be 50%. If the ratio is acceptable, then the compressed section is stored in the non-volatile memory (step 312). In the example illustrated in FIG. 4, section 404*a* is compressed with the LZRW1 arithmetic and stored as compressed section 406*a* of compressed SDRAM 406.

If the ratio is not acceptable, then the compression arithmetic that has the next fastest decompression speed is selected (step 318), if not all compression algorithms have been tried yet (step 316). Since a compression algorithm with a slower decompression speed typically has a higher compression ratio, the compression algorithm selected in step 318 has a higher probability of achieving a higher compression ratio and therefore passing the acceptable compression ratio threshold. After step 318, steps 308 and 310 are repeated, where the selected section is compressed with the newly selected compression arithmetic and the resulting compression ratio is compared to the acceptable threshold compression ratio.

It may be that after all the available compression algorithms has been tried, that no compression arithmetic can achieve an acceptable compression ratio (the "yes" branch of the step 316). At this point, the compression data is compared to the original data (step 320). If the compressed data is smaller than the original data, then the compress data is stored in the non-volatile memory (step 312). If the compressed data is actually larger than the original data, however, then original uncompressed data is stored in non-volatile memory (step 322).

As long as there are uncompressed or unprocessed sections in the RAM (step 314), another uncompressed/unprocessed section is selected (step 304), and the steps described above for compressing the selected section are repeated. The process terminates when there are no more uncompressed/unprocessed sections (the "no" branch of step 314).

According to one embodiment, a mapping table is used to save information that indicates which compression arithmetic is used to compressed which section. When the hibernated system wakes up, the mapping table is consulted to determine which decompression arithmetic to use for decompressing data in the sections.

Figure 5:
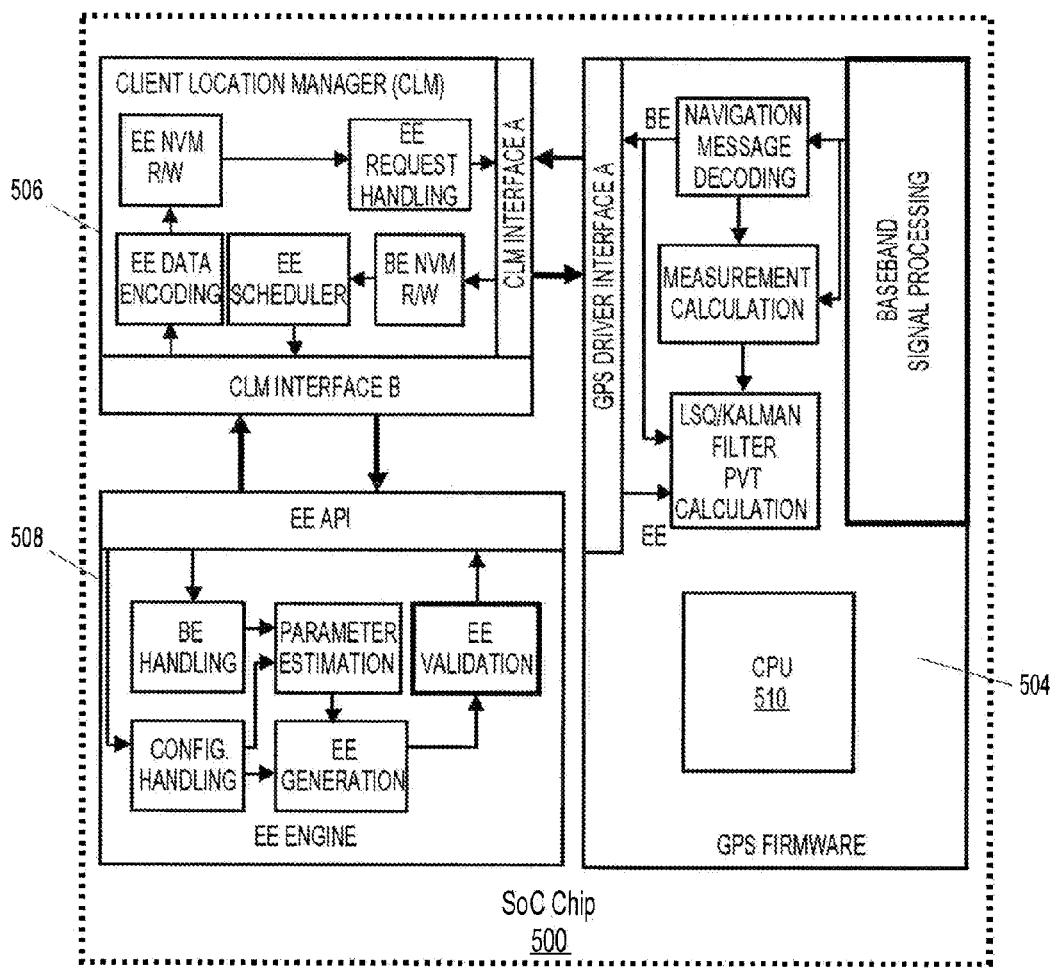
FIG. 5 is a block diagram that illustrates an example system architecture in which embodiments of the invention can be practiced.

Embodiments of the hibernation and/or compression aspects of the invention can be implemented on a system on a chip (SOC) 500 included in a PND as shown in FIG. 5. Example platforms that can be adapted for use with the invention include SiRF Prima, Titan and Atlas SOCs. It should be apparent that chip 500 can be implemented with additional functionality not shown in FIG. 5, as well as different combinations and arrangements of functionality than shown in FIG. 5. However, details regarding such additional functionality or alternative arrangements will be omitted here for sake of clarity of the invention.

As further shown in FIG. 5, chip 500 includes a client location manager (CLM) 506 and EE engine 508. CLM 506 generally includes functional components for managing the collection and storage of broadcast ephemeris downloaded by GPS section 504, and for managing and scheduling the calculation of extended ephemeris calculated by EE engine 508. EE engine 508 generally includes functional components for calculating extended ephemeris based on received and/or stored broadcast ephemeris.

According to aspects of the invention, chip 500 includes a CPU 510 and associated registers (not shown) whose contents are saved to RAM (not shown) in chip 500 during hibernation. As will be appreciated by those skilled in the art, the RAM further includes operating system code and data and application code and data for execution and use by CPU 510 to operate the PND. In accordance with the invention, the RAM even further includes code that implements the hibernation/compression functionality described herein for execution by CPU 510.

According to further aspects of the invention, certain data stored in and used by sections 504, 506 and/or 508 are also saved to RAM during hibernation. Typically, the GPS data includes last GPS position/velocity/time solution, GPS navigation data bits collected from the satellites (ephemeris, almanac; basically all the 1500 bits in the frame, per satellite, if the device is using data stripped acquisition or tracking), any calibration data (such as TCXO, XO or RTC oscillator frequency versus temperature and associated data), system configuration data such as the TCXO frequency, baud rate settings and so on. It should be apparent that not all of this data need be stored in all embodiments, and that the types of data stored for a stand-alone GPS system may or may not be similar to an SOC system.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of compressing data in a RAM of an embedded device, comprising:
dividing the RAM into a plurality of sections;
for each section in the plurality of sections, performing the steps of:
selecting a first compression arithmetic;
generating a set of compression data, the set of compression data comprising data in the each section compressed using the first compression arithmetic;
in response to determining that the set of compressed data does not meet a compression-ratio requirement, performing the steps of:
selecting a second compression arithmetic; and
regenerating the set of compression data, the set of compression data comprising data in the each section compressed using the second compression arithmetic;
storing information that indicates an association between a compression arithmetic used to generate the set of compressed data and the each section; and
storing the set of compressed data to a non-volatile data storage medium.

2. The method of claim 1, wherein the first compression arithmetic has a higher decompression speed than the second compression arithmetic.

3. The method of claim 1, further comprising:
powering off the device.

4. The method of claim 1, further comprising:
waking the device.

5. The method of claim 4, wherein waking the device comprises:
for each section in the plurality of sections, performing the steps of:
selecting, based on information that indicates an association between the compression arithmetic used to generate the set of compressed data for the each section, a decompression arithmetic; and
decompressing the set of compressed data for the each section using the decompression arithmetic.

6. The method of claim 1, wherein the data stored in the RAM of the device comprises data in one or more registers of a Central Processing Unit (CPU) of the device.

7. The method of claim 1, wherein the data stored in the RAM of the device comprises data in one or more registers of a system-on-chip (SOC) of the device.

8. The method of claim 1, wherein the RAM is an SDRAM.

9. The method of claim 1, wherein the non-volatile storage is one of: a hard drive, an SD card, an MMC memory, and a flash memory.

10. An embedded device comprising a RAM and a non-volatile data storage medium, the embedded device further comprising:
means for dividing the RAM into a plurality of sections;
each section in the plurality of sections, comprising:
means for selecting a first compression arithmetic;
means for generating a set of compression data, the set of compression data comprising data in the each section compressed using the first compression arithmetic;
means for determining whether the set of compressed data meets a compression-ratio requirement;
means for selecting a second compression arithmetic if it is determined that the set of compressed data does not meet a compression-ratio requirement; and
means for regenerating the set of compression data, the set of compression data comprising data in the each section compressed using the second compression arithmetic;
means for storing information that indicates an association between a compression arithmetic used to generate the set of compressed data and the each section; and
means for storing the set of compressed data to a non-volatile data storage medium.

11. The embedded device of claim 10, wherein the embedded device comprises a GPS receiver.

12. The embedded device of claim 10, wherein the data stored in the RAM of the device comprises data in one or more registers of a Central Processing Unit (CPU) of the device.

13. The embedded device of claim 10, wherein the data stored in the RAM of the device comprises data in one or more registers of a system-on-chip (SOC) of the device.

14. The embedded device of claim 10, wherein the RAM is an SDRAM.

15. The method of claim 10, wherein the non-volatile storage is one of: a hard drive, an SD card, an MMC memory, and a flash memory.

* * * * *

UNITED STATES PATENT AND TRADEMARK OFFICE
CERTIFICATE OF CORRECTION

PATENT NO.         : 8,145,833 B1
APPLICATION NO.    : 12/609560
DATED              : March 27, 2012
INVENTOR(S)        : Duan It is certified that error appears in the above-identified patent and that said Letters Patent is hereby corrected as shown below:

In Column 2, Line 35, delete "ration," and insert -- ratio, --, therefor.

In Column 8, Line 63, in Claim 15, delete "method" and insert -- embedded device --, therefor.

Signed and Sealed this
Nineteenth Day of March, 2013

Teresa Stanek Rea
*Acting Director of the United States Patent and Trademark Office*